United States Patent Office 3,426,821
Patented Feb. 11, 1969

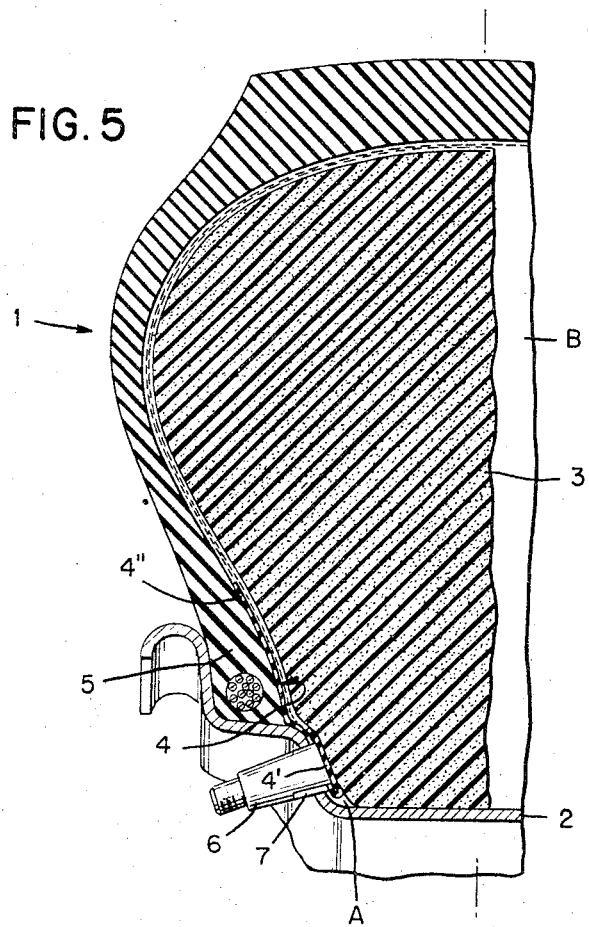

3,426,821
SAFETY DEVICES FOR TIRE COVERS
Jacques Boileau, Clermont-Ferrand, France, assignor to Compagnie Generale des Etablissements Michelin rauon Sociale Michelin & Cie, Clermont-Ferrand, Puy-de-Dome, France
Filed June 27, 1966, Ser. No. 560,646
Claims priority, application France, June 29, 1965, 22,830; Sept. 28, 1965, 33,021
U.S. Cl. 152—155
Int. Cl. B60c 17/04
11 Claims

ABSTRACT OF THE DISCLOSURE

A safety tire is provided with a filling ring consisting of a resilient mass having gas-tight cells containing a gas under pressure. One or more flexible gas impervious membranes are provided for isolating the inner portion of the filling ring from the remainder thereof to enable the inner portion of the filling ring to be maintained at a pressure not substantially exceeding atmospheric pressure when the tire casing is inflated. In this way, a substantial differential pressure is developed across the filling ring. Even at high speeds, this differential pressure prevents the filling ring from expanding radially (because of centrifugal force) and coming into abrasive contact with the casing in the tread area.

---

This invention relates to improvements in safety devices for tires and more particularly to safety devices provided to prevent the collapse or flattening of tires as the result of a puncture or any other cause of loss of pressure.

It has been proposed heretofore to place in the tire casing an annular filling consisting of a resilient cellular mass with gas-tight cells containing gas under pressure. This filling has a free air volume which is substantially equal to the interior volume of the casing and is compressed to smaller volume against the rim when the casing is inflated to normal or close to normal pressure. If the air in the casing escapes, the filling expands and fills the casing and the tire can be used to drive safely under practically normal conditions and without risking rapid deterioration of the casing. When deflated and cold, the deflated tire is similar in behavior to an underinflated tire. However, after operating for some time, heating of the filling results in the increase of pressure of the enclosed gas in the cells of the filling, and the tire performs substantially the same as a normally inflated tire.

A filling such as the one described constitutes, as long as it is in working condition, a safety device and a means of assistance in an emergency, enabling the vehicle to be operated until the tire can be repaired. However, its lifetime is limited and, paradoxically, its deterioration progresses relatively slowly when it is being used as an emergency inflating device in the casing. As a matter of fact, it is possible to drive a great many miles on a casing supported by the filling only, before the filling is destroyed. It is when the tire casing is inflated and the filling is in compressed condition that it is in the greatest danger of destruction. Experience shows that the cellular filling ring is retained against the rim and out of contact with the casing in the tread area only when the tire is operated at low or moderate speeds, for example, 50 km./hour. At a higher speed of rotation of the wheel, contrifugal force exerts forces on the cellular filling ring which lead to its destruction. X-ray photographs show that above a certain speed, the ring deforms, then releases from the rim and starts floating in the casing, and finally, at increasing speed, flattens itself against the casing behind the tread. At very high speeds, waving or rippling occurs at the surface of the ring. During these deformations and movements of the annular filling, it comes into contact with the inner wall of the casing or the rim. As the surfaces coming into contact do not necessarily have equal speeds at the time of contact, friction and extreme damage to the filling results. Inasmuch as the cellular filling is fragile, it cannot resist such friction, abrasion and deformation very long before being seriously damaged or destroyed. Furthermore, displacement and deformation of the annular filling bring about sudden shocks and unbalance in the behavior of the tire causing it to run untrue with all the inherent disadvantages thereof.

In accordance with the present invention, tires are provided which overcome the effects of centrifugal force in causing deformation or displacement of the annular filling from the rim against the interior of the casing.

More particularly, in accordance with the invention the new safety tire includes a resilient annular filling of cellular material with gas tight cells containing a gas under pressure and is characterized in that at least the portion of the filling adjacent to the rim is subjected to atmospheric or lower pressure while the exterior of the remainder of the filling is subjected to the pressure of the gas in the tire casing.

The cellular filling is of such volume that it fills the space between the rim and the casing when the casing is deflated. When a gas under pressure is introduced into the casing between it and the filler, the pressure compresses the filling and forces it against the rim and holds it there despite the centrifugal force which may be developed at high speeds. The force counteracting the centrifugal force is at least equal to the difference in pressure between the outside atmosphere and the operating pressure of the tire.

It is essential that the filling be made of a cellular material with impervious cells. A filling of sponge rubber or other cellular material with communicating cells and enclosed in a gas-tight casing, would resist centrifugation very poorly if it were to contain a gas under pressure. Centrifugation would separate the gas from the solid material, and the latter would separate from the rim and flatten itself against the casing. Thus, cellular material with communicating cells would have the disadvantages sought to be avoided.

The invention may have numerous practical embodiments. For example, a partition for separating the compartment in the tire between the casing and the cellular filling and the compartment controlling the filling and communicating with atmosphere may comprise two gas-tight membranes of annular form having approximately the same diameter as the bead, each having one of its edges fastened to one of the beads of the tire and the other edge cemented to the lateral wall of the filling. These membranes may be made of gas-impervious and elastic material such as, for example, butyl rubber. Instead of two membranes, the partition may consist of only one membrane extending from one bead of the tire to the other with the casing and the filling being situated on opposite sides of the membrane.

The edges of the membrane or of the two membrane elements may be cemented to the bead or wedged between the bases of the beads and their seats on the rim.

In another variant, a single membrane may have its edges cemented to the filling in such a manner as to form an air chamber surrounding the filling.

In another embodiment, the filling may be provided with circumferential lateral projections which the inflation pressure forces against the rim; so that the filling itself forms an impervious barrier between the compartment containing gas under pressure and a compartment between the rim and the filling at atmospheric or lower pressure.

In accordance with another modification which may be combined with the above-mentioned embodiments the compartment containing the inner portion or all of the ring-shaped filling may be connected to a chamber, for example, forming a part of the rim, wherein a pressure is maintained which is lower than atmospheric pressure. In a variation, this reduced pressure chamber may be a cavity provided in the bottom of the ring-shaped filling itself.

By increasing the difference in pressure prevailing on both sides of the safety filling, an increased force is exerted on the filling for resisting centrifugal force and preventing deformation of the filling which might cause its displacement into contact with the casing. If the filling is used as a gas-tight barrier for retaining it tightly against the rim, the retaining force may be increased by adding to the inflation pressure of the casing the reduced pressure provided by the vacuum chamber, even if such reduced pressure is relatively small, for example, one third or one fourth of atmospheric pressure.

In the various embodiments of the invention, it is necessary that the compartment adjoining the rim be maintained at atmospheric pressure or less by using a rim which is not gas-tight, for example, a two piece rim without a sealed joint. Likewise, the opening for securing the valve stem may be modified or the valve stem provided with a groove connected with the filler compartment to enable the maintenance of atmospheric pressure in the filler compartment.

The valve may be united with the membrane enclosing the filler ring or one of the membranes cemented to the filler rings, and it may be mounted in the rim in the normal manner. This solution is preferable to passing of a tube made of some rigid or even flexible material through the filling.

For a better understanding of the invention, reference may be had to the accompanying drawings in which:

FIGURE 5 is a cross-sectional and partially broken away view of the tire of FIGURE 1 prior to inflation thereof.

Figure 1:
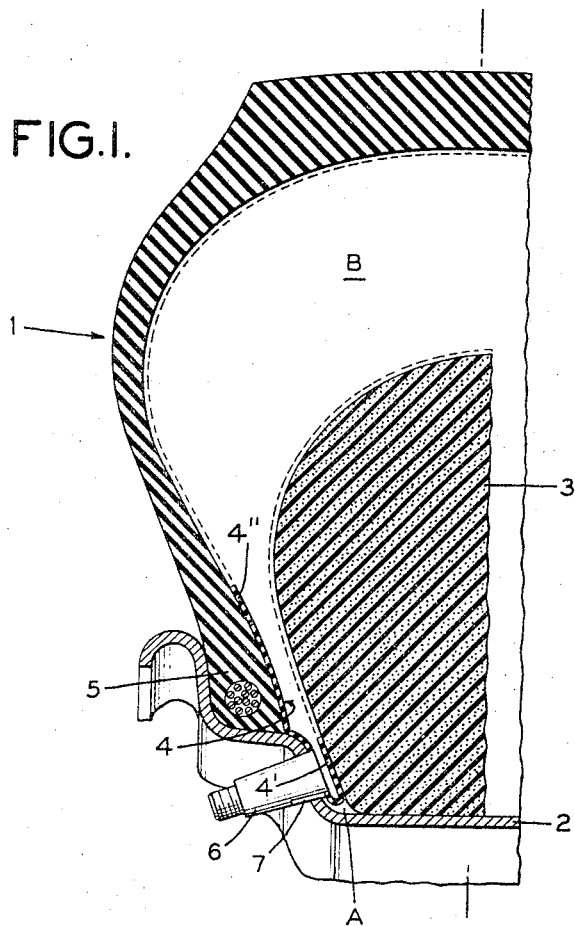
FIGURE 1 is a view in cross-section and partially broken away of a tire in accordance with the present invention mounted on the rim of a vehicle wheel.

In the typical embodiment of the invention disclosed in FIGURE 1, the tire casing 1 is mounted on a wheel having a hollow base or well 2. A ring-shaped filling 3, is installed in the hollow base of the rim. In this example, the filling 3 consists of polyurethane foam or other suitable foamed elastomer with gas-tight cells containing a gas under pressure. The volume of the filling in non-compressed condition is a little greater than that of the interior of the casing and the cross section of the filling is substantially the same as the shape of the interior of the casing (see FIGURE 5). In order to provide in this tire two compartments in accordance with the invention, i.e., a compartment A in communication with the atmosphere and a compartment B containing gas under pressure, a ring-shaped membrane 4 which is impervious and elastic, preferably consisting of butyl rubber, extends between each of the sidewalls of the filling 3 and the interior wall of each of the beads 5 of the casing 1. The membrane 4, or other gas-impervious elastomer, is cemented with its edge 4' overlapping the sidewall of the filling 3 while its edge 4" overlaps the inner surface of the casing to assure tightness with the bead 5. A valve stem 6 is united to the membrane 4 and extends through the wall of the rim 2. The valve stem 6 communicates with the compartment B which consequently may be inflated by means of the valve. Communication between the compartment A and the atmosphere is permitted for the reason that the valve 6 does not completely close the orifice 7 arranged in the wall of the rim 2. For example, the outer surface of the rubber valve body may have at least one longitudinal groove 7 with its inner end outside of the membrane 4 so as to assure communication between the compartment A and the atmosphere.

In a modification of the tire disclosed in FIGURE 1, the edge 4' and/or 4" of the membrane 4 may be extended as shown in dashes, i.e., around the filling 3 (edge 4') and/or around the interior of the casing (edge 4"). If the membrane 4 extends around the filling 3 it is unnecessary to cement the membrane 4 to the filling, and if the membrane extends around the inside of the casing, it need not be cemented to the casing.

Figure 2:
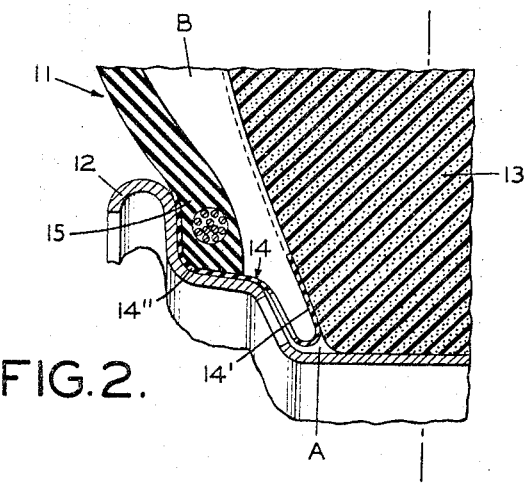
FIGURE 2 is a cross-sectional and partially broken away view of a modification thereof.

A modified form of the invention is illustrated in FIGURE 2, in which the edge 14" of the membrane 4 is secured by wedging it between the bead 15 of the casing 11 and the irm 12. Here again the edge 14' of the membrane may stop a relatively short distance above the base of th efilling 13, as is shown in unbroken lines or it may be extended around the outside of said filling, as shown by the broken line, to the opposite bead.

Figure 3:
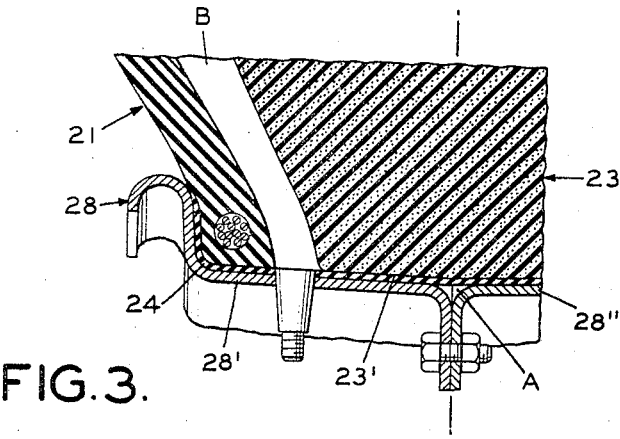
FIGURE 3 is a cross-sectional and partially broken away view of another modification thereof.

The modification shown in FIGURE 3 is similar to the tire shown in FIGURE 2 except for the fact that the casing 21, the filling 23 and the membrane 24 are mounted in a rim 28 having a flat base and consisting of two halves 28' and 28" connected by means of screws or bolts, without a gas-tight joint between them. In this tire, the compartment A between the membrane 24 and the rim 28 is in communication with the atmosphere between the two halves 28' and 28" of the rim. The membrane is cemented to the inner surface 23' of the filling 23.

Figure 4:
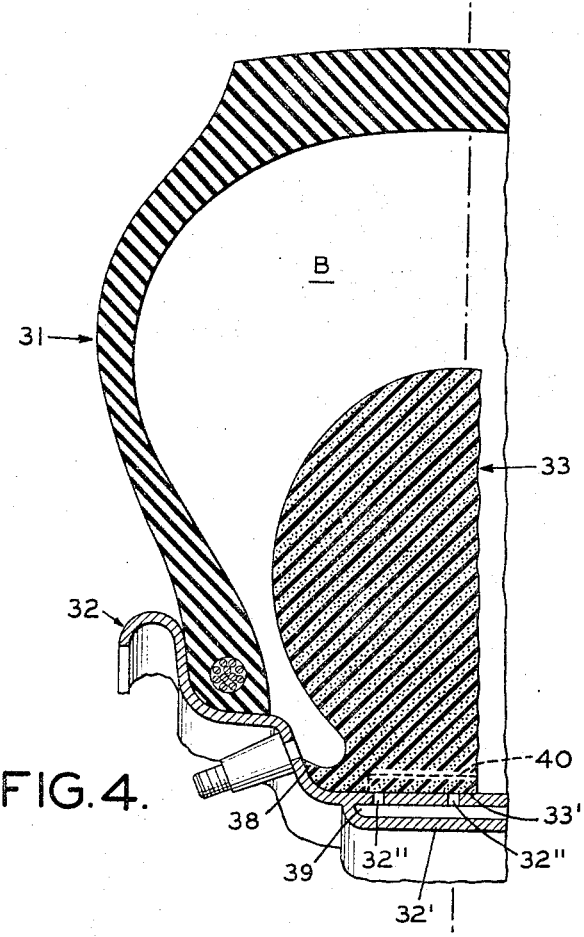
FIGURE 4 is a cross-sectional and partially broken away view of a further modification thereof.

In the embodiment shown in FIGURE 4, the radially interior surface 33' of the filling 33 is not subjected to the inflation pressure which prevails in the chamber B inasmuch as this surface is isolated from the chamber B by means of circumferential lateral lips or projections 38 on both sides of the base of the filling 33, and molded integrally with the latter. Under the effect of the inflation pressure in the chamber B the lips 38 are forced against the interior wall of the rim 32 so that surface 33' of the filling is thus not subjected to the tire inflation pressure. With this arrangement and also with those described in FIGURES 1 to 3, the difference between the inflation pressure in chamber B and the pressure (atmospheric pressure) to which the isolated face 33' of the filling 33 is subjected, may be increased by providing a reduced pressure chamber in communication with the said surface. Such chamber may be formed either on the inside of the rim, for example underneath the hollow base 32', by a ring-shaped enclosed space 39 in communication with the surface 33' by means of one or more openings 32" provided in the bottom of the hollow base 32', or by a ring-shaped cavity 40 shown in broken line in the drawing, provided in the base 33' of the filling. In such a case, the chamber bordered by the cavity 40 and the bottom of the hollow base is put under a subatmospheric pressure by means of an orifice 32" provided in the said bottom and connected with a vacuum source.

In all the examples described above, and in general, the inflation pressure of the compartment B should be substantially the same as required for an ordinary tire of the same size as the one in accordance with the invention while the pressure of the gas enclosed in the impervious cells of the filling is higher than the atmospheric pressure and may be less than approximately 200 g./cm.$^2$.

Inasmuch as the tires embodying the invention are susceptible to considerable modification and variation within the scope of the present invention, the examples of the invention disclosed herein should be considered as illustrative.

I claim:
1. In combination, a wheel rim, a tire for mounting on said rim, said tire comprising a tire casing having beads for engaging said rim, a filling ring in said casing of resilient cellular material having gas-tight cells filled with gas at superatmospheric pressure, said ring substantially filling said casing, valve means operatively associtaed with said tire for introducing gas under superatmospheric pressure into said casing between said casing and said filling ring to inflate said casing and compress said filling ring, and at least one flexible gas-impervious membrane operatively associated with said filling ring for isolating at least the inner portion of said filling ring adapted to be disposed adjacent to the rim from the gas pressure in said casing to enable said inner portion to be maintained at a pressure not substantially exceeding atmospheric pressure when said casing is inflated.

2. The tire set forth in claim 1 in which said flexible gas-impervious membrane is annular and has edges cemented to said filling ring in such a manner as to form an air chamber surrounding said filling ring.

3. The tire set forth in claim 1 further comprising a second flexible gas-impervious membrane, said membranes extending between opposite lateral sides of said filling ring and said beads on said casing.

4. The tire set forth in claim 1 in which said flexible gas-impervious membrane extends around said filling ring, exclusive of said inner portion, and overlaps said beads on said casing.

5. The tire set forth in claim 1 in which said flexible gas-impervious membrane extends around the interior of said casing and around the exterior of said filling ring, exclusive of said inner portion.

6. The tire set forth in claim 1 in which said flexible gas-impervious membrane extends between said beads and is secured to said inner portion of said filling ring, the gas introduced into said casing through said valve means being retained between said membrane and said filling ring.

7. The tire set forth in claim 1 in which said flexible gas-impervious membrane includes a flexible gas-impervious lip extending laterally from and circumferentially around said inner portion of said filling ring for sealing engagement with said rim.

8. The tire set forth in claim 1 in which said flexible gas-impervious membrane extends between said inner portion of said filling ring and said beads and a circumferential recess in the inner surface of said filling ring adapted to be subjected to pressure not exceeding atmospheric pressure.

9. The tire set forth in claim 3 in which said membranes are adhered to said filling ring.

10. The tire set forth in claim 3 in which said membranes are adhered to said filling ring and said casing.

11. The tire set forth in claim 1 in which said inner portion of said filling ring is adapted to be subjected to a subatmospheric pressure.

References Cited
UNITED STATES PATENTS

| | | | |
|---|---|---|---|
| 2,242,788 | 5/1941 | Marks | 152—158 |
| 3,195,601 | 7/1965 | Travers | 152—313 |

ARTHUR L. LA POINT, *Primary Examiner.*

C. B. LYON, *Assistant Examiner.*

U.S. Cl. X.R.

152—158